United States Patent
Cai et al.

(10) Patent No.: US 7,500,685 B2
(45) Date of Patent: Mar. 10, 2009

(54) BUSHING SUPPORT RING FOR STABILIZER BAR

(75) Inventors: Haimian Cai, Ann Arbor, MI (US); Xinjian Fan, Plymouth, MI (US); Mikhal El Arculli, Canton, MI (US)

(73) Assignee: Automotive Components Holding, LLC, Dearborn, MI (US)

( * ) Notice: Subject to any disclaimer, the term of this patent is extended or adjusted under 35 U.S.C. 154(b) by 411 days.

(21) Appl. No.: 11/390,410

(22) Filed: Mar. 27, 2006

(65) Prior Publication Data

US 2006/0181046 A1     Aug. 17, 2006

Related U.S. Application Data

(62) Division of application No. 10/721,651, filed on Nov. 25, 2003, now Pat. No. 7,065,875.

(51) Int. Cl.
*B60G 21/055* (2006.01)
(52) U.S. Cl. .......... 280/124.106; 280/124.107; 280/124.166; 267/183; 267/188
(58) Field of Classification Search .......... 280/124.106, 280/124.107, 124.166; 267/183, 188
See application file for complete search history.

(56) References Cited

U.S. PATENT DOCUMENTS

| | | | | |
|---|---|---|---|---|
| 3,366,356 A | * | 1/1968 | Fisher | 248/56 |
| 4,916,749 A | * | 4/1990 | Urban et al. | 384/298 |
| 5,013,166 A | * | 5/1991 | Domer | 384/220 |
| 5,829,769 A | * | 11/1998 | Hillqvist | 280/124.107 |
| 5,857,800 A | * | 1/1999 | Nell | 403/344 |
| 5,884,926 A | * | 3/1999 | Muzio et al. | 280/124.107 |
| 6,523,843 B2 | * | 2/2003 | Wiesemann et al. | 280/124.107 |
| 6,685,381 B1 | * | 2/2004 | Sugita et al. | 403/341 |
| 6,845,994 B2 | * | 1/2005 | Cai et al. | 280/124.107 |
| 7,128,328 B2 | * | 10/2006 | Torongo | 280/124.107 |
| 7,188,851 B2 | * | 3/2007 | Furuyama et al. | 280/124.107 |
| 2002/0121733 A1 | * | 9/2002 | Lewis et al. | 267/189 |

* cited by examiner

*Primary Examiner*—Eric Culbreth
*Assistant Examiner*—George D. Spisich
(74) *Attorney, Agent, or Firm*—Macmillan, Sobanski & Todd, LLC

(57) ABSTRACT

A stabilizer bar assembly for an automotive vehicle includes a stabilizer bar, a bushing mounted to the stabilizer bar, and a support ring mounted onto the stabilizer bar adjacent the bushing to provide a stop to prevent the bushing from moving axially along the stabilizer bar. The support ring has a plurality of inwardly extending projections. Each of the inwardly extending projections has a distal end in contact with an outer surface of the stabilizer bar. The distal ends of the inwardly extending projections are welded to the outer surface of the stabilizer bar to secure the support ring onto the stabilizer bar.

11 Claims, 5 Drawing Sheets

US 7,500,685 B2

BUSHING SUPPORT RING FOR STABILIZER BAR

CROSS-REFERENCE TO RELATED APPLICATION

This application is a divisional of the U.S. patent application Ser. No. 10/721,651, filed Nov. 25, 2003 now U.S. Pat. No. 7,065,875.

BACKGROUND OF INVENTION

1. Technical Field of the Invention

The present invention generally relates to a stabilizer bar for an automotive vehicle. More specifically, the present invention relates to a stabilizer bar having a bushing support mounted thereon to prevent the bushing from moving axially along the stabilizer bar.

2. Description of the Prior Art

In an automotive vehicle, a stabilizer bar helps to keep the vehicle level, particularly when the vehicle is traveling through a curve. The ends of the stabilizer bar are connected to the right and left wheel assemblies of the vehicle. A pair of brackets, positioned between the ends of the stabilizer bar, secure the stabilizer bar to a structural component of the vehicle. Rubber bushings positioned between the stabilizer bar and the brackets provide limited torsional, axial and radial movement of the stabilizer bar relative to the bracket. The rubber bushings also dampen the movement of the stabilizer bar. Accordingly, the stiffness, or spring rate, of the bushings affects the feel of the suspension of the vehicle.

To keep the bushings positioned on the stabilizer bar, a stop is usually formed within, or mounted onto, the stabilizer bar. Sometimes the stops are provided as an annular rib, or ribs, extending around the stabilizer bar. This makes the stabilizer bar more difficult to manufacture and adds weight to the stabilizer bar. Alternatively, the bushings can be secured in position on the stabilizer bar by using a chemical bonding agent. This, again, adds cost and complexity to the manufacturing process.

As seen from the above, there is a need for an improved stabilizer bar assembly which uses a lightweight, inexpensive ring that is attached to the stabilizer bar to prevent axial movement of the bushing relative to the stabilizer bar.

SUMMARY OF THE INVENTION

The disadvantages of the prior art are overcome by providing a stabilizer bar assembly, in accordance with the present invention, in which the stabilizer bar assembly includes a stabilizer bar having a bushing mounted thereon. The assembly further includes a support ring that is attached to the stabilizer bar through electrical resistance welding.

In a first aspect of the present invention the support ring has a plurality of inwardly extending projections, each having a distal end that is welded to an outer surface of the stabilizer bar.

In another aspect of the present invention, the support ring is a single piece having the inwardly extending projections spaced about the support ring such that the distal ends of the inwardly extending projections contact the outer surface of the stabilizer bar at spaced apart locations circumferentially about the stabilizer bar.

The support ring comprises a plurality of portions that each includes a plurality of inwardly extending projections having distal ends that are welded onto an outer surface of the stabilizer bar.

DESCRIPTION OF THE PREFERRED EMBODIMENTS

Figure 1:
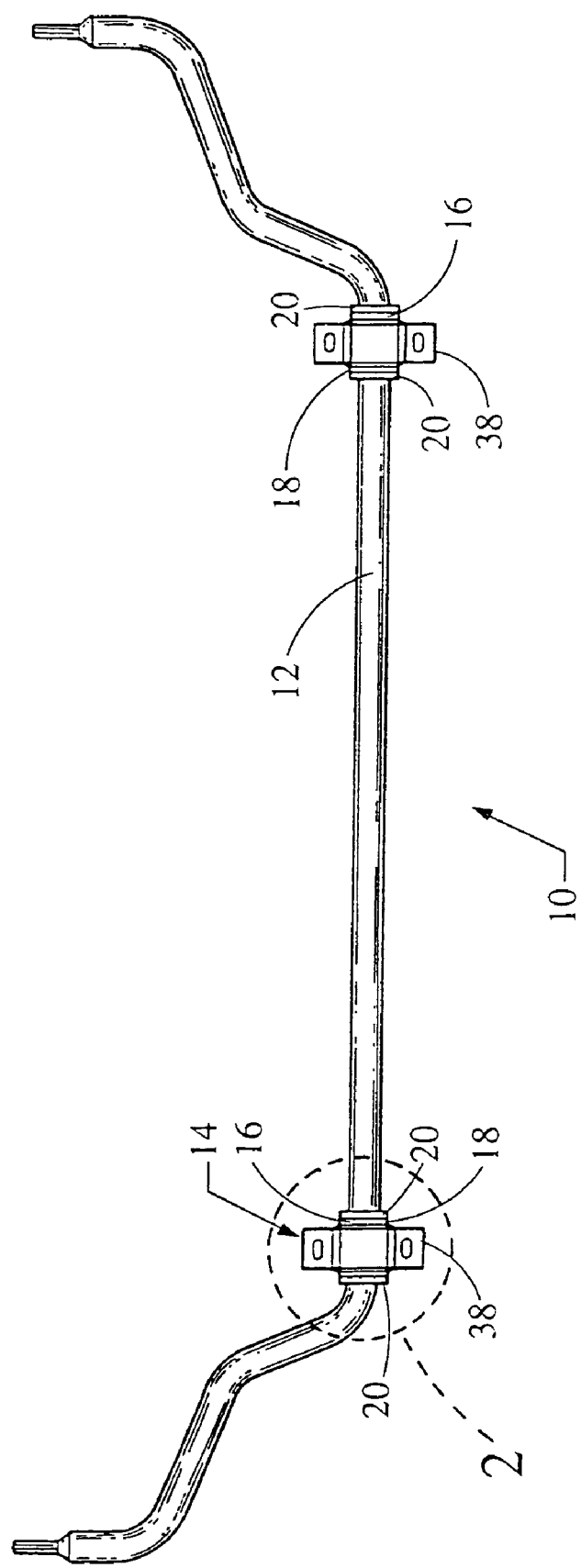
FIG. 1 is a plan view of a stabilizer bar of the present invention.
Figure 2:
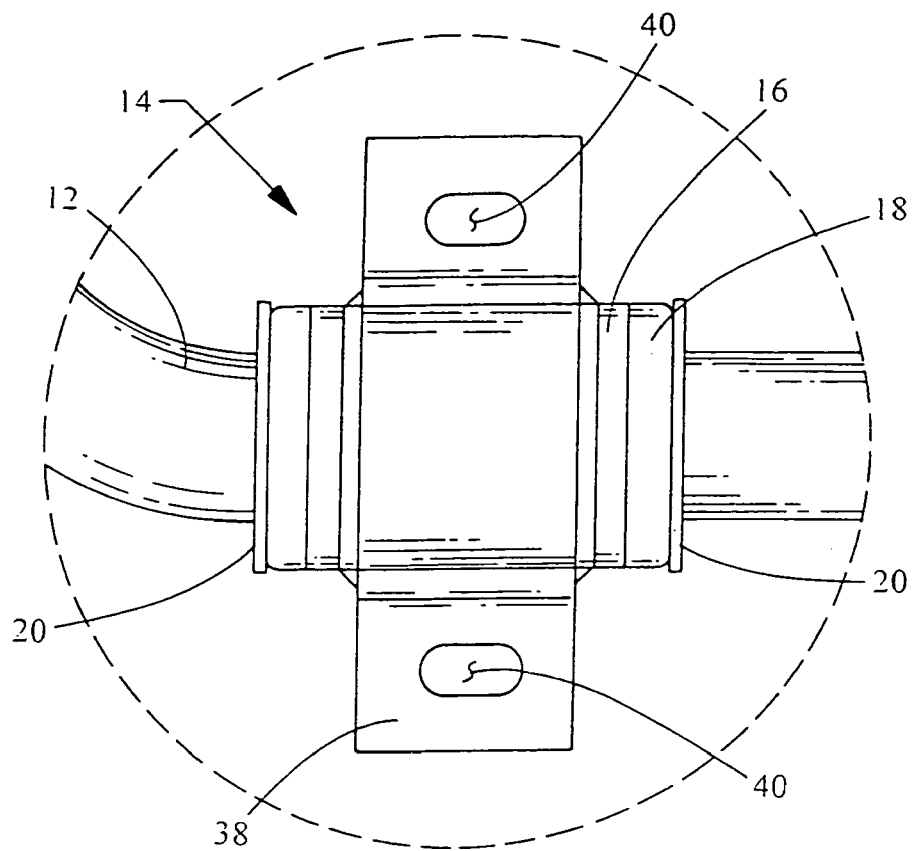
FIG. 2 is an enlarged view of the portion of the stabilizer bar shown in FIG. 1 enclosed by the circle numbered 2.

Referring to FIGS. 1 and 2, a stabilizer bar assembly for an automotive vehicle is shown generally at 10. The stabilizer bar assembly 10 includes a stabilizer bar 12 with at least one bushing assembly 14 mounted thereon. The stabilizer bar 12 is generally made from steel, and can be solid or hollow. It is to be understood, that the stabilizer bar 12 can be made from other suitable materials. The bushing assemblies 14 include a bushing retainer 16 that encompasses a bushing 18 and is in mechanical compressive engagement with the bushing 18 such that the bushing 18 is frictionally engaged with the stabilizer bar 12.

The bushing 18 is made from an elastomeric material, such as rubber, or some other resilient material. The bushing 18 is generally sleeve shaped having a cylindrical outer surface and a round passage extending therethrough defining an inner diameter. Preferably, the inner diameter of the bushing 18 is slightly smaller than an outer diameter of the stabilizer bar 12, however it is to be understood that the present invention can be practiced with a bushing 18 having an inner diameter that is equal to or slightly larger than the outer diameter of the stabilizer bar 12.

Preferably, the bushing 18 is held onto the stabilizer bar 12 by friction, however, an adhesive can also be applied between the inner diameter of the bushing 18 and the stabilizer bar 12 to provide additional retention of the bushing 18 on the stabilizer bar 12. Once the bushing 18 is properly located on the stabilizer bar 12, the bushing retainer 16 is positioned about the bushing 18. The bushing retainer 16 is generally sleeve shaped having an inner diameter large enough to accommodate the bushing 18. It is to be understood, that the present invention can be practiced with other types of bushings, particularly with bushings that do not include an adhesive or a bushing retainer.

The stabilizer bar 12 also includes support rings 20 mounted thereon. The support rings 20 are adapted to prevent the bushing 18 from moving axially along the stabilizer bar. Referring to FIG. 2, preferably, a support ring 20 is mounted adjacent the bushing 18 on either side of the bushing 18 to prevent the bushing 18 from moving axially in either directions along the stabilizer bar 12. Alternatively, the stabilizer bar 12 could include only one support ring 20 positioned adjacent the bushing 18 on one side to prevent movement of the bushing in only one direction.

Figure 3:
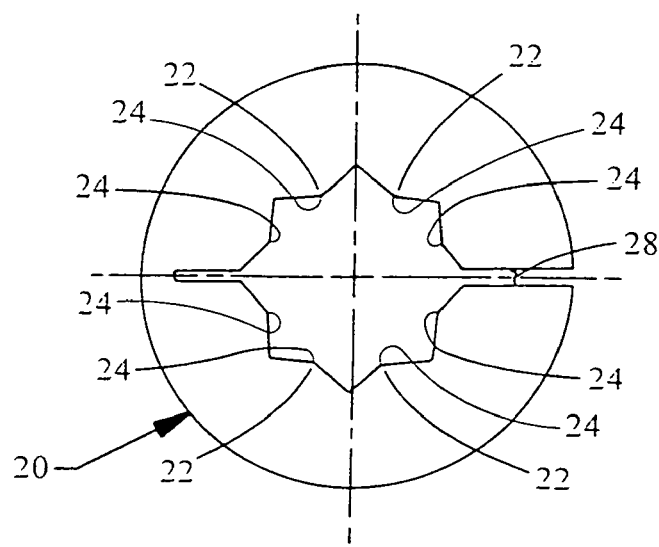
FIG. 3 is a plan view of a first embodiment of a support ring of the stabilizer bar shown in FIGS. 1 and 2.

Referring to FIG. 3, in a first embodiment of the support ring 20, the support ring 20 is a single piece stamping. It is to be understood that the single piece support ring 20 could be manufactured by other suitable methods. The support ring 20, as shown, is generally circular ring shaped and has a plurality of inwardly extending projections 22 formed therein. Each of the inwardly extending projections 22 includes a distal end 24. The distal ends 24 of the inwardly extending projections 22 are welded onto an outer surface 26 of the stabilizer bar. Preferably, the distal ends 24 of the inwardly extending projections 22 are welded by electrical resistance welding, however, it is to be understood that other appropriate welding techniques can be used.

Figure 4:
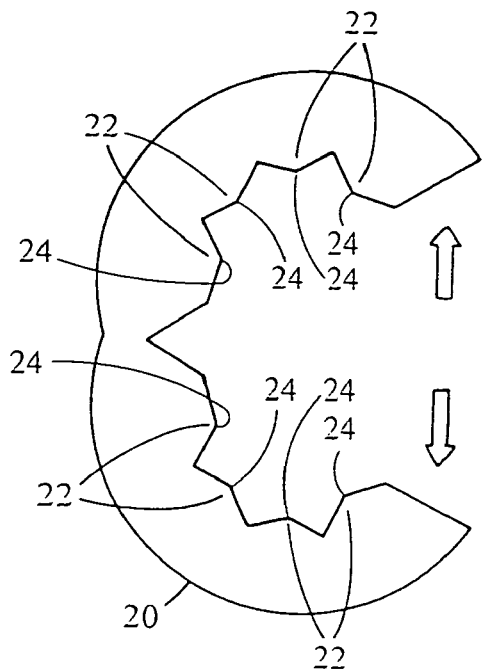
FIGS. 4-7 are figures illustrating how the support ring shown in FIG. 3 is opened, placed onto the stabilizer bar, and welded in place.
Figure 5:
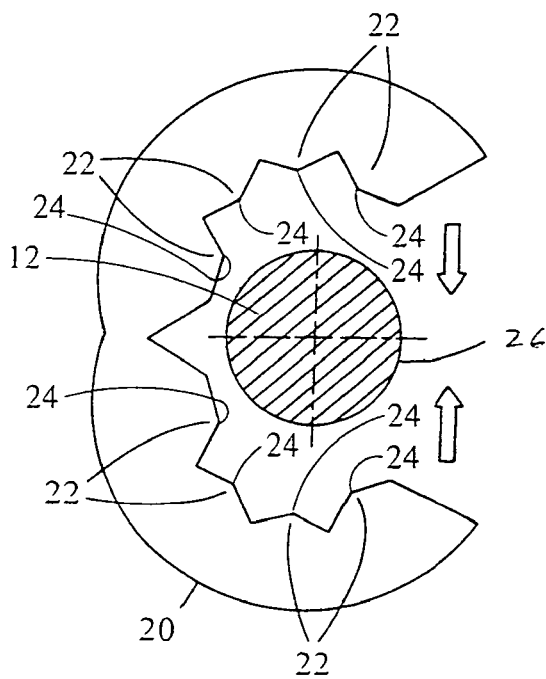
Figure 6:
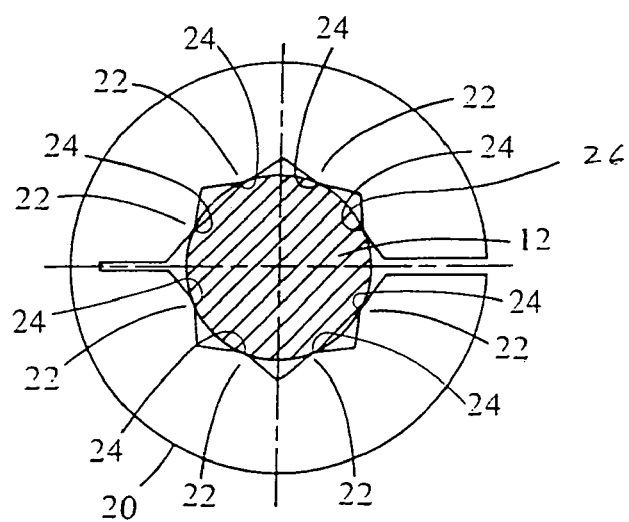

Referring to FIGS. 4-7, the support ring 20 is placed onto the stabilizer bar 12 and welded in place. The support ring 20 is formed as a single piece having a generally circular ring shape. An opening 28 is formed within the support ring 20 to allow the support ring 20 to be opened up as shown in FIG. 4. Alternatively, the support ring 20 can be formed in the open position as shown in FIG. 4. Once the support ring 20 is opened up such that the stabilizer bar can fit within the opening 28, then the support ring 20 is forced back to a closed position around the stabilizer bar 12, as shown in FIG. 5. The support ring 20 is closed to a point where the distal ends 24 of the inwardly extending projections 22 are in contact with the outer surface 26 of the stabilizer bar, as shown in FIG. 6.

Figure 7:
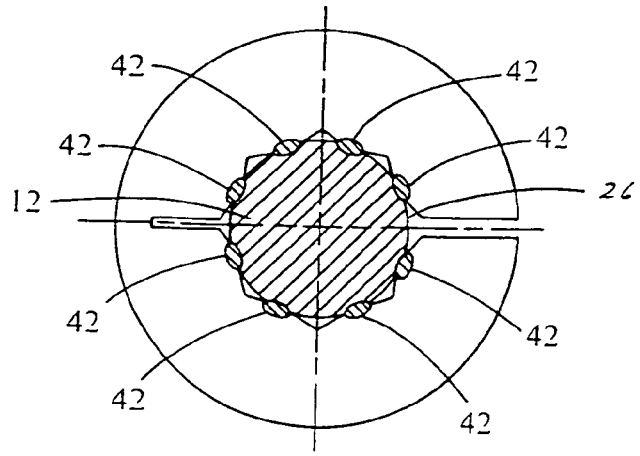

After the support ring 20 has been placed onto the stabilizer bar 12, radial pressure is exerted onto the support ring 20 to keep the distal ends 24 of the inwardly extending projections 22 in solid contact with the outer surface 26 of the stabilizer bar. While under pressure, an electric current is passed through the support ring 20 and the stabilizer bar 12 in order to form welds 42 between the distal ends 24 of the inwardly extending projections 22 and the outer surface 26 of the stabilizer bar 12 by electrical resistance welding, as shown in FIG. 7. The inwardly extending projections 22 are spaced about the support ring 20 such that the distal ends 24 of the inwardly extending projections 22 contact the outer surface 26 of the stabilizer bar 12 at spaced apart locations circumferentially about the stabilizer bar 12.

Figure 8:
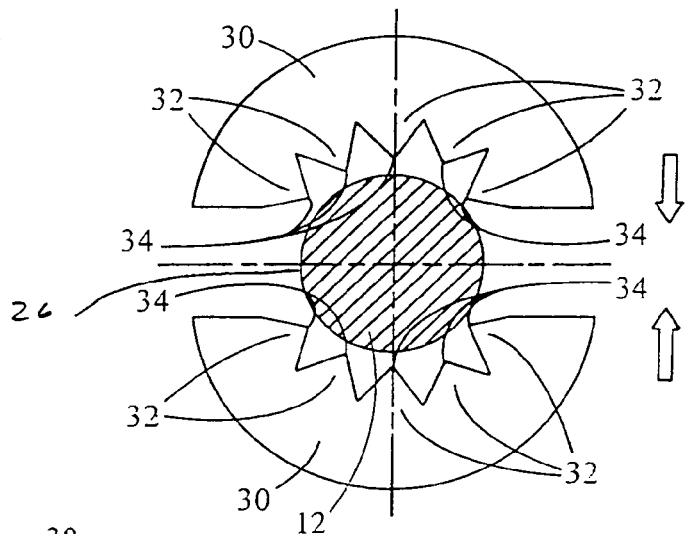
FIGS. 8-11 are figures illustrating how a second embodiment of the support ring is placed onto the stabilizer bar and welded in place.
Figure 9:
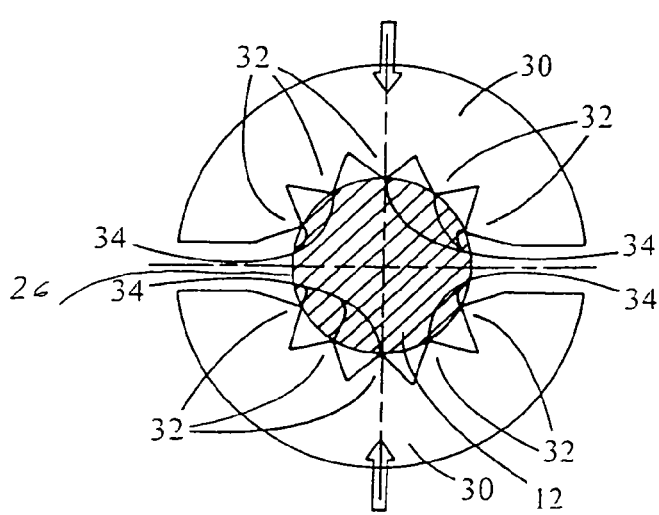
Figure 10:
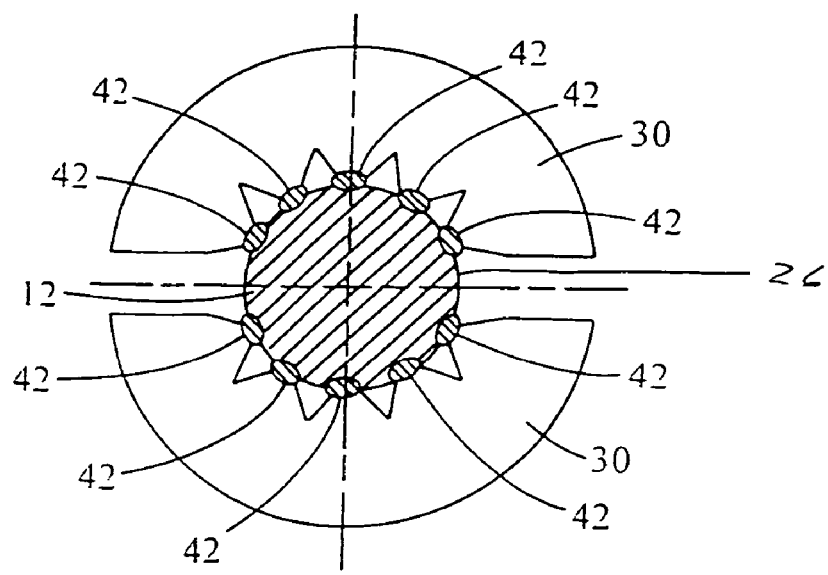
Figure 11:
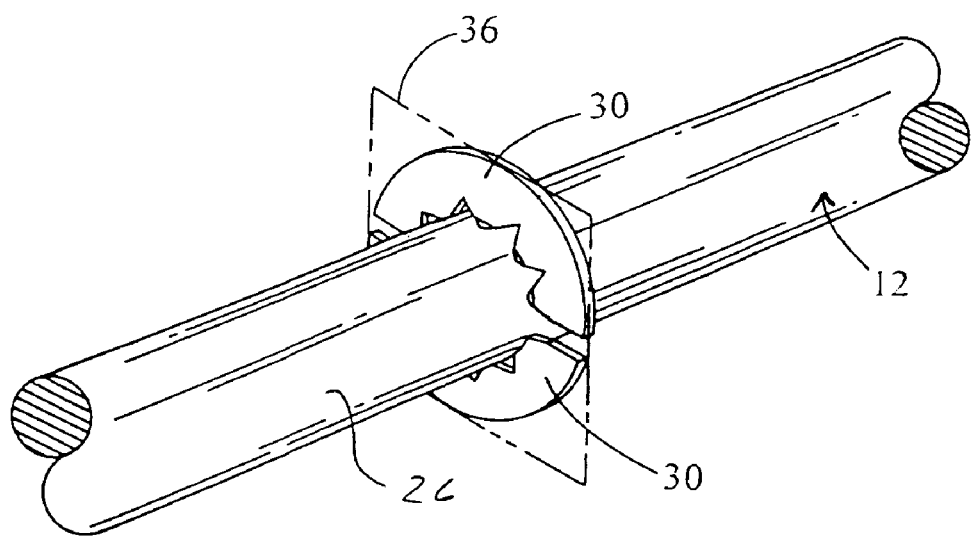

Referring to FIGS. 8-10, a second embodiment of the support ring 20 comprises a plurality of generally semi-circular portions 30. Each of the portions 30 has a plurality of inwardly extending projections 32 having distal ends 34 that are welded onto the outer surface 26 of the stabilizer bar 12. The portions 30 are spaced circumferentially about the stabilizer bar 12. Preferably, the portions 30 are mounted to the stabilizer bar 12 such that each of the portions 30 are aligned with one another in such a way that the portions 30 cooperate to provide support for the bushing 18 around the stabilizer bar 12, as shown in FIG. 11.

When mounting the portions 30 onto the stabilizer bar, the portions are placed circumferentially about the stabilizer bar 12 such that the distal ends 34 of the inwardly extending projections 32 are in contact with the outer surface 26 of the stabilizer bar 12, as shown in FIGS. 8 and 9. After the portions 30 have been placed onto the stabilizer bar 12, radial pressure is exerted onto the portions 30 to keep the distal ends 34 of the inwardly extending projections 32 in solid contact with the outer surface 26 of the stabilizer bar 12.

While under pressure, an electric current is passed through the support ring 20 and the stabilizer bar 12 in order to form welds 42 between the distal ends 34 of the inwardly extending projections 32 and the outer surface 26 of the stabilizer bar 12 by electrical resistance-welding, as shown in FIG. 10.

Referring again to FIGS. 1 and 2, a mounting bracket 38 is attached to the bushing retainer 16 to allow the bushing retainer 16 to be mounted to a structural component of the automobile. Preferably, the mounting bracket 38 includes mounting holes 40 that allow the mounting bracket 38 to be attached to the structure of an automobile. With the bushing 18 being made from a resilient material that allows limited movement of the stabilizer bar 12 relative to the bushing retainer 16, the bushing assembly 14 provides a spring rate and dampening of the torsional, radial, and axial movement of the stabilizer bar 12 relative to the structure of the vehicle.

The foregoing discussion discloses and describes various embodiments of the invention. One skilled in the art will readily recognize from such discussion, and from the accompanying drawings and claims, that changes and modifications can be made to the invention without departing from the scope of the invention as defined in the following claims. The invention has been described in an illustrative manner, and it is to be understood that the terminology which has been used is intended to be in the nature of words of description rather than of limitation.

What is claimed is:

1. A stabilizer assembly for an automotive vehicle comprising:
    a stabilizer bar;
    a bushing mounted to said stabilizer bar;
    a support ring including separate portions spaced about and mounted onto said stabilizer bar, each portion including inwardly extending projections having a distal end contacting an outer surface of said stabilizer bar and welded to said outer surface.

2. The stabilizer bar assembly of claim 1 wherein said portions of said support ring are mounted to said stabilizer bar such that each of said portions is aligned with one another.

3. The stabilizer bar assembly of claim 1 further including a bushing retainer mounted about said bushing.

4. The stabilizer bar assembly of claim 3 further including a mounting bracket fixedly connected to said bushing retainer, said mounting bracket being adapted to connect to a structural component of an automobile.

5. A stabilizer bar assembly for an automotive vehicle comprising:
    a stabilizer bar;
    a bushing overlapping an outer surface of said stabilizer bar and extending along the bar between a first end and a second end;
    a support ring including separate portions spaced about and secured to said stabilizer bar adjacent the first end, each portion including inwardly extending projections, each projection having a distal end in contact with an outer surface of said stabilizer bar and welded to said outer surface.

6. The stabilizer bar assembly of claim 5 wherein said portions of said support ring are mounted to said stabilizer bar such that each of said portions is aligned with one another.

7. The stabilizer bar assembly of claim 5 further including a bushing retainer mounted about said bushing.

8. The stabilizer bar assembly of claim 7 further including a mounting bracket fixedly connected to said bushing retainer, said mounting bracket being adapted to connect to a structural component of an automobile.

9. The stabilizer bar assembly of claim 7 further including a second support ring secured to said stabilizer bar adjacent the second end of said bushing, including a plurality of inwardly extending projections, each of said inwardly extending projections having a distal end in contact with an outer surface of said stabilizer bar, said distal ends of said inwardly extending projections being welded to said outer surface of said stabilizer bar to secure said support ring onto said stabilizer bar.

10. A stabilizer bar assembly for an automotive vehicle comprising:

a stabilizer bar;

a bushing overlapping an outer surface of said stabilizer bar and extending along the bar between a first end and a second end that is axially opposite the first end;

a bushing retainer mounted about said bushing; and a support ring including separate portions spaced about and secured to said stabilizer bar adjacent the first end, each portion including inwardly extending projections, each projection having a distal end in contact with an outer surface of said stabilizer bar and welded to said outer surface.

11. The stabilizer bar assembly of claim 10 further comprising a mounting bracket fixedly connected to said bushing retainer, said mounting bracket being adapted to connect to a structural component of the vehicle.

* * * * *